US012773952B2

(12) United States Patent
Astrike

(10) Patent No.: US 12,773,952 B2
(45) Date of Patent: Oct. 27, 2026

(54) SUPPORT STRUCTURE FOR A LID OF A VEHICLE STORAGE RECEPTACLE

(71) Applicant: Toyota Motor Engineering & Manufacturing North America, Inc., Plano, TX (US)

(72) Inventor: Logan R. Astrike, Dexter, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 330 days.

(21) Appl. No.: 18/498,740

(22) Filed: Oct. 31, 2023

(65) Prior Publication Data

US 2025/0136001 A1 May 1, 2025

(51) Int. Cl.
*B60R 5/00* (2006.01)

(52) U.S. Cl.
CPC .................................... *B60R 5/00* (2013.01)

(58) Field of Classification Search
CPC ...................................................... B60R 5/00
USPC ....................................................... 220/831
See application file for complete search history.

(56) References Cited

U.S. PATENT DOCUMENTS

| | | | | |
|---|---|---|---|---|
| 3,104,131 A * | 9/1963 | Krone | A47C 7/546 | 312/235.8 |
| 3,663,990 A * | 5/1972 | Shane | E05D 1/04 | 16/350 |
| 5,017,039 A * | 5/1991 | Spiess | E03F 5/06 | 404/25 |
| 6,513,195 B2 * | 2/2003 | Haase | B65D 43/164 | 220/832 |
| 6,575,323 B1 | 6/2003 | Martin et al. | | |
| 11,114,828 B2 * | 9/2021 | Mortun | H02G 3/088 | |
| 2002/0017522 A1 * | 2/2002 | Bando | B65D 83/0805 | 220/827 |
| 2013/0026778 A1 * | 1/2013 | Biggs | B60R 7/04 | 296/37.1 |

* cited by examiner

*Primary Examiner* — Andrew D Perreault
(74) *Attorney, Agent, or Firm* — Christopher G. Darrow; Darrow Mustafa PC

(57) ABSTRACT

A storage receptacle assembly for a vehicle includes a lid support structure having a base, a wall extending from the base, and a slot having a first edge formed in the base and a second edge formed in the wall. A projection engagement structure is positioned below the slot and includes a floor, a shoulder extending upwardly from the floor, and a ramp extending upwardly from the shoulder. A lid includes a projection structured to extend into the slot and to reside above the ramp when the lid is positioned in a closed orientation. The projection is structured to contact the ramp, slide down the ramp to the shoulder, and slide off the shoulder into contact with the floor during rotation of the lid from the closed orientation to an open orientation. The lid may be maintained in any of multiple open orientations without lid props or similar devices.

9 Claims, 8 Drawing Sheets

SUPPORT STRUCTURE FOR A LID OF A VEHICLE STORAGE RECEPTACLE

TECHNICAL FIELD

The embodiments disclosed herein relate to storage receptacles mounted in vehicles and, more particularly, to a structure designed to enable rotation of a storage receptacle lid to an open condition and to support and maintain the lid in the open condition.

BACKGROUND

Vehicles may incorporate storage receptacles for storing various items. A vehicle storage receptacle may have a lid rotatably connected to the receptacle or the lid may be removable. Typically, to connect the lid to the receptacle and maintain the lid in an open orientation, a hinge and/or other hardware may be used. However, there are vehicle designs in which, due to size and shape constraints of the lid and receptacle, hinges and other attachment features cannot fit where needed. Accordingly, in some cases, an alternative method of maintaining the lid in an open or raised condition is needed.

SUMMARY

In one aspect of the embodiments described herein, a storage receptacle assembly for a vehicle is provided. The assembly includes a lid support structure having a base, a wall extending from the base, and a slot having a first edge formed in the base and a second edge formed in the wall. The assembly also includes a projection engagement structure positioned below the slot and including a floor, a shoulder extending upwardly from the floor, and a ramp extending upwardly from the shoulder. The assembly also includes a lid having a projection structured to extend into the slot and to reside above the ramp when the lid is positioned in a closed orientation. The projection is structured to contact the ramp, slide down the ramp to the shoulder, and slide off the shoulder into contact with the floor during rotation of the lid from the closed orientation to an open orientation.

BRIEF DESCRIPTION OF THE DRAWINGS

In embodiments described herein, a storage receptacle assembly for a vehicle is provided. The assembly includes a lid support structure having a base, a wall extending from the base, and a slot having a first edge formed in the base and a second edge formed in the wall. The assembly also includes a projection engagement structure positioned below the slot. The projection engagement structure includes a floor, a shoulder extending upwardly from the floor, and a ramp extending upwardly from the shoulder. The assembly also includes a lid having a projection structured to extend into the slot and to reside above the ramp when the lid is positioned in a closed orientation. The projection is structured to contact the ramp, slide down the ramp to the shoulder, and slide off the shoulder into contact with the floor during rotation of the lid from the closed orientation to an open orientation. The structures described enable the lid to be rotated between a closed orientation and any of multiple open orientations without the use of any hinges. The lid may also be supported in any of multiple open orientations without the use of lid props or similar devices.

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple sub-elements or multiple sub-elements may be designed as one element. In some embodiments, an element shown as an internal component of another element may be implemented as an external component and vice versa. Furthermore, elements may not be drawn to scale.

DETAILED DESCRIPTION

Figure 1:
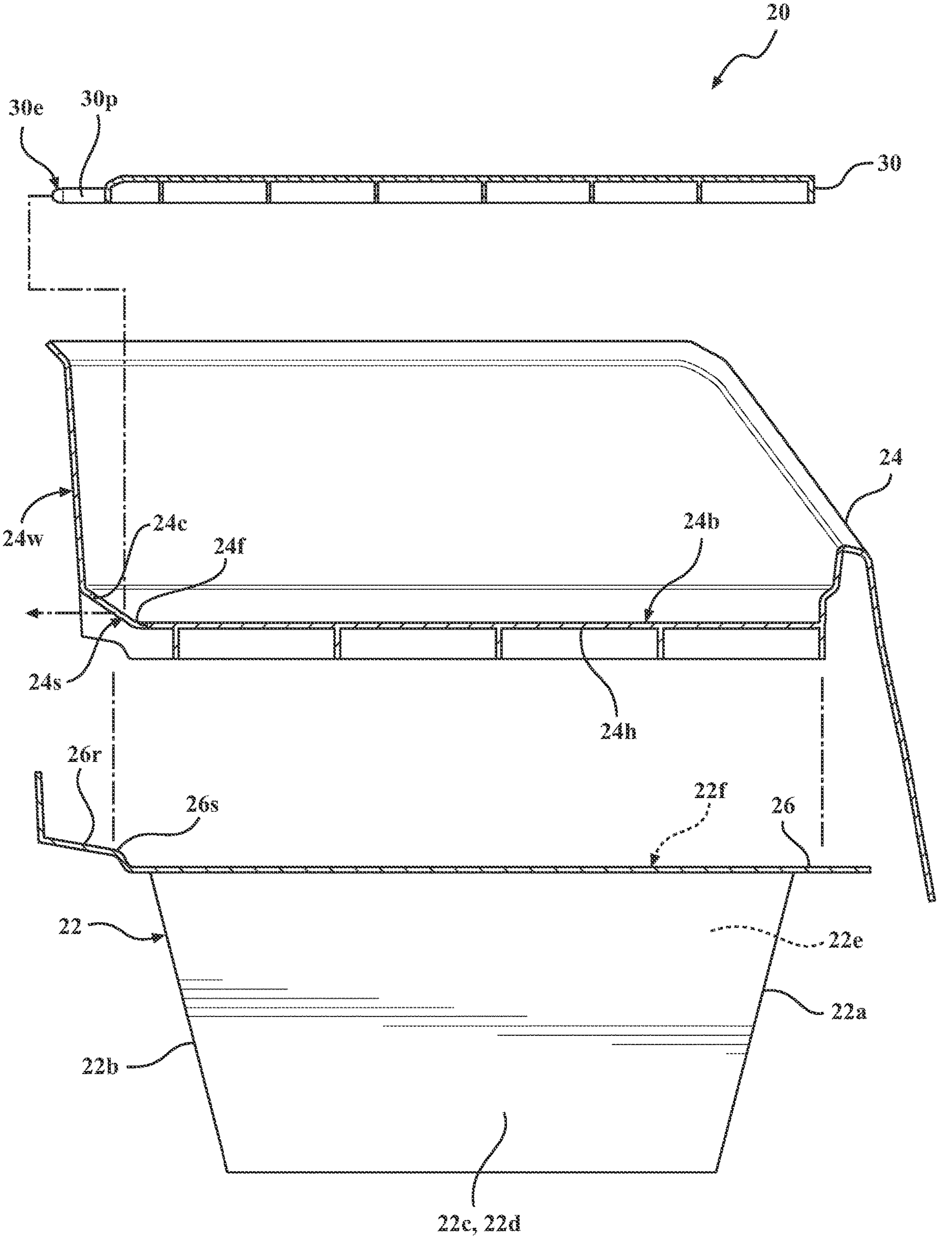
FIG. 1 is a schematic exploded side view of a storage receptacle assembly in accordance with an embodiment described herein.

A storage receptacle assembly for a vehicle includes a lid support structure having a base, a wall extending from the base, and a slot having a first edge formed in the base and a second edge formed in the wall. The assembly also includes a projection engagement structure positioned below the slot and includes a floor, a shoulder extending upwardly from the floor, and a ramp extending upwardly from the shoulder. The assembly also includes a lid having a projection structured to extend into the slot and to reside above the ramp when the lid is positioned in a closed orientation. The projection is structured to contact the ramp, slide down the ramp to the shoulder, and slide off the shoulder into contact with the floor during rotation of the lid from the closed orientation to an open orientation. The storage receptacle assembly structures described herein enable the lid to remain mounted on the receptacle or to be removed from the receptacle if desired. The structures also enable the lid to be rotated between a closed orientation and any of multiple open orientations and maintained in an open orientation without the use of any hinges, lid props or similar devices.

In the following description, the front, rear, left, right, upper, and lower directions and positions relating to the storage receptacle assembly indicate the front, back, left, right, up and down directions from the perspective of a user positioned adjacent a front wall of a receptacle mounted on (or incorporated into) a vehicle. Also, vertical and horizontal directions are defined with respect to a level road surface upon which the vehicle rests. That is, a horizontal direction or plane lies parallel to a level road surface upon which the vehicle rests, and a vertical direction or plane lies perpendicular to the horizontal direction or plane. A receptacle lid as described herein may rest horizontally when the lid is in its closed position. Also, similar elements of the invention appearing in different drawings may have similar reference characters associated therewith.

Figure 3:
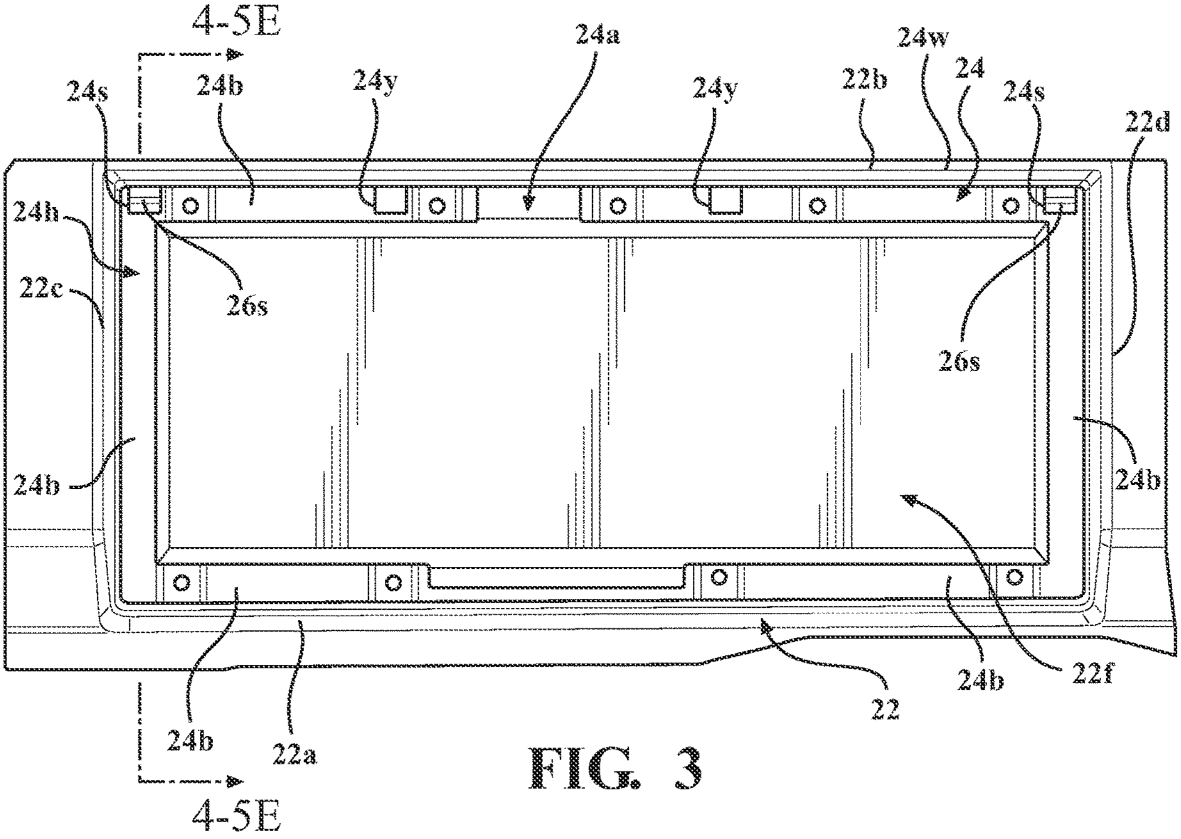
FIG. 3 is a schematic plan view looking down into an interior cavity of a storage receptacle and showing a lid support structure in accordance with an embodiment described herein extending along walls of the storage receptacle.

FIG. 1 is a schematic exploded side view of a storage receptacle assembly (generally designated 20) in accordance with an embodiment described herein. The storage receptacle assembly 20 may be incorporated into (or mounted on) a vehicle (not shown). In one or more arrangements, the assembly 20 may include a receptacle 22 having a front wall 22*a*, a rear wall 22*b* positioned opposite the front wall 22*a*, and a pair of opposed side walls 22*c*, 22*d*, with each side wall extending between the front wall 22*a* and the rear wall 22*b*. The receptacle 22 in FIG. 1 is shown in an upright orientation in which it would be positioned in or on a vehicle resting on a level ground surface. In combination, the front wall 22*a*, rear wall 22*b*, and opposed side walls 22*c*. 22*d* may define an interior cavity 22*e* structured for receiving therein items for storage. Uppermost edges of the front wall, rear wall, and opposed side walls may combine to define a top opening 22*f* of the receptacle 22. FIG. 3 is a schematic plan view looking down into an interior cavity of a storage receptacle and showing a lid support structure (generally designated 24) in accordance with an embodiment described herein extending along walls of the storage receptacle 22.

Figure 4:
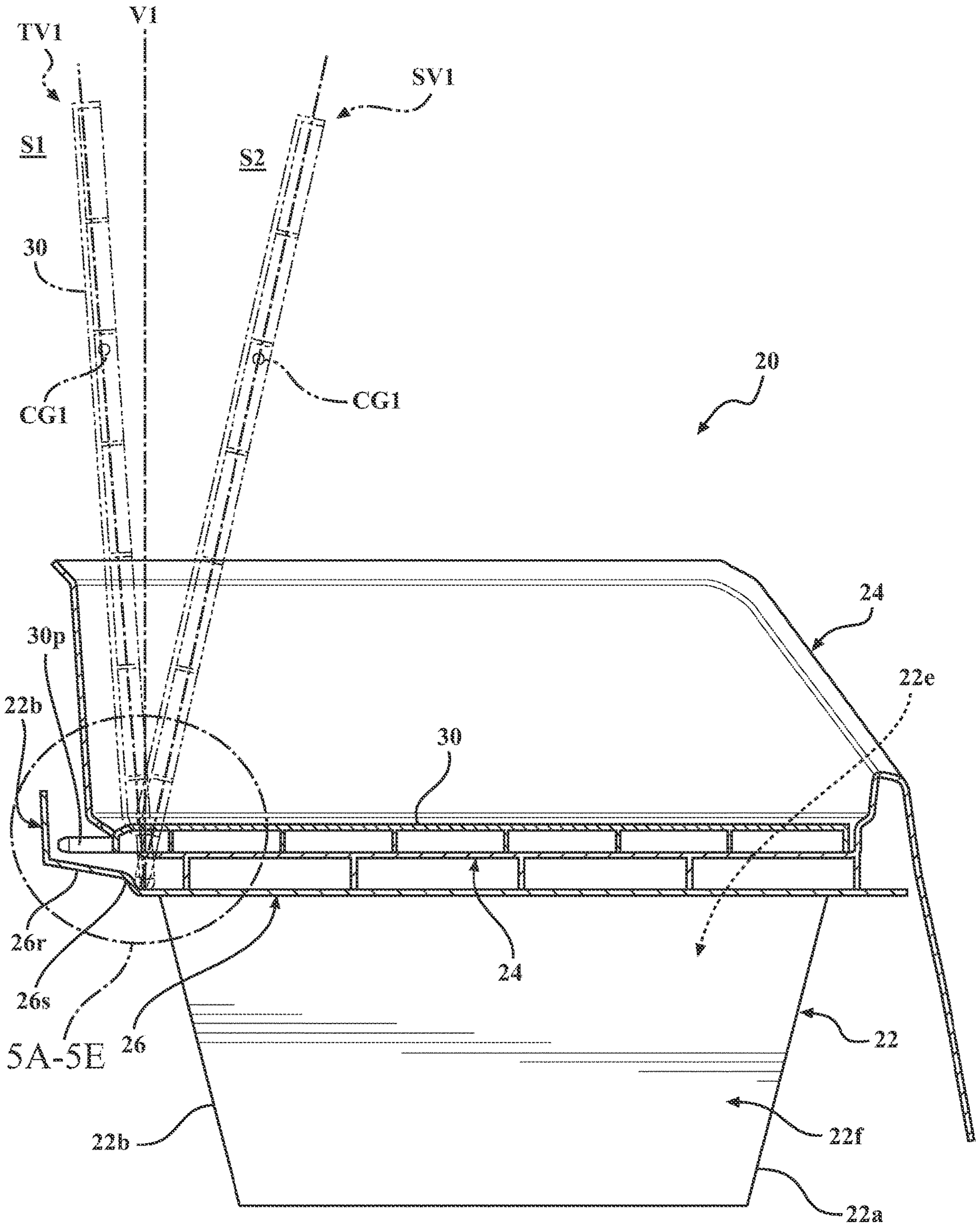
FIG. 4 is a schematic side cross-sectional view of the storage receptacle of FIG. 1 in assembled form, and showing a pair of open orientations of a lid of the receptacle assembly.
Figure 5A:
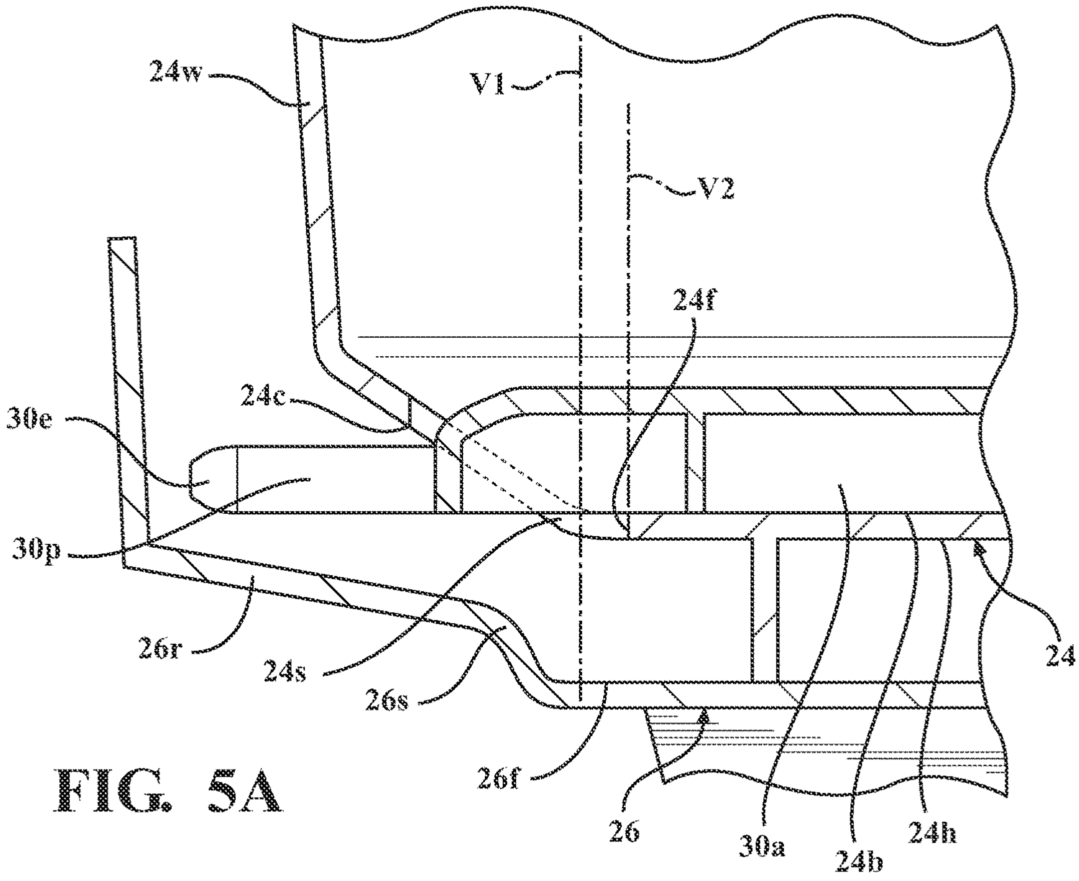
FIG. 5A is a magnified portion of the view of FIG. 4, showing a lid of the storage receptacle in a closed orientation.

FIG. 4 is a schematic side cross-sectional view of the storage receptacle of FIG. 1 in assembled form, and showing a pair of open orientations of a lid 30 of the receptacle assembly 20. FIG. 5A is a magnified portion of the view of FIG. 4, showing the lid 30 in a closed orientation. A "closed orientation" of the lid 30 may be an orientation as shown in FIG. 5A in which the lid 30 is lockable (by one or more locking mechanisms operably coupled to the lid and the receptacle) (not shown) to cover and block the receptacle opening 22*f*, to prevent access to the interior cavity 22*e* of the receptacle 22. In a situation where a vehicle incorporating the storage receptacle 20 is parked on a level (i.e., non-sloped) ground surface, the closed orientation of the lid 30 may be a horizontal orientation.

Referring to FIGS. 3-5A, in one or more arrangements, the receptacle assembly 20 may include at least one lid support structure 24 extending along interior surface(s) or uppermost edge(s) of one or more of the front wall 22*a*, rear wall 22*b*, and side walls 22*c*, 22*d*. In one or more arrangements, the lid support structure 24 may extend continuously along interior surfaces of the receptacle front wall 22*a*, the side walls 22*c*. 22*d*, and portions of the rear wall 22*b*, with a gap 24*a* in the lid support structure 24 formed along the rear wall 22*b*. The lid support structure 24 may be formed as a single unitary piece, or elements of the lid support structure 24 may be formed as separate pieces to be attached to associated ones of the front wall 22*a*, the side walls 22*c*. 22*d*, and/or portions of the rear wall 22*b*.

The lid support structure 24 may be configured to support a lid 30 of the storage receptacle 22 when the lid 30 is in a closed orientation as described herein. The lid support structure 24 may also be configured to be engaged by a locking mechanism (not shown) mounted on the lid 30, for locking the lid in a closed condition. To these ends, each lid support structure formed as a single piece may include one or more support surfaces (such as surfaces 24*b* shown in the drawings) structured to be physically contacted by the lid 30 to support the lid when the lid is in the closed orientation. In arrangements where the lid support structure is formed as separate pieces, the pieces may be fabricated and mounted on the receptacle 22 so that the respective lid support surfaces 24*b* of all the pieces are coplanar (within applicable tolerance limits) when the pieces are mounted on the receptacle 22.

Referring to FIGS. 3-5A, each lid support structure 24 may include a base 24*h* including lid support surface(s) 24*b* extending along upper surfaces of the base, a wall 24*w* extending from the base 24*h*, and at least one slot 24*s* having a first edge 24*f* formed in the base 24*h* and a second edge 24*c* formed in the wall 24*w*. Each slot 24*s* may extend along a portion of an intersection of the wall 24*w* with the base 24*h*. In the embodiment shown in FIGS. 3-5A, the lid support structure 24 includes a pair of spaced-apart slots 24*s* formed in the wall 24*w* and structured as previously described. Slots 24*s* are shown positioned proximate respective opposite ends of the lid support structure 24, each slot 24*s* being structured for receiving a respective projection 30*p* extending from lid 30 as described in greater detail below. In other arrangements, the slots 24*s* may be located spaced apart from the ends of the lid support structure 24.

Referring to FIGS. 4 and 5A, the storage receptacle assembly 20 may also include at least one projection engagement structure (generally designated 26) positioned below each lid support structure slot 24*s*. In one or more arrangements, each projection engagement structure 26 may include a floor 26*f*, a shoulder 26*s* extending upwardly from the floor 26*f*, and a ramp 26*r* extending upwardly from the shoulder 26*s*. The embodiment shown in FIGS. 3-5A includes a pair of projection engagement structures 26, with each projection engagement structure positioned below an associated one of slots 24*s* as described herein.

Each floor 26*f* may be structured to support an associated lid projection 30*p* (described in greater detail below) at least between the associated shoulder 26*s* and a vertical plane V2 extending through a first edge 24*f* of an associated slot 24*s* when the lid 30 is in one of the open orientations described herein. Each shoulder 26*s* may have an exterior radius determined so as to block movement of the lid projection 30*p* along floor 26*f* when the lid 30 is in a sub-vertical open orientation SV1 as shown in described herein and shown in FIG. 4, thereby maintaining the lid 30 in the sub-vertical open orientation SV1. A range of exterior radii suitable for this purpose may be determined analytically and/or iteratively, through experimentation, for a particular design of storage receptacle assembly. In the plan view of FIG. 3, portions of the shoulders 26*s* may be seen through the slots 24*s* residing below the lid support structure 24. Elements of the projection engagement structure 26 may be fabricated so that all of the floors 26*f*, shoulders 26*s*, and ramps 26*r* incorporated into the projection engagement structure 26 are coplanar (within applicable tolerance limits) when the projection engagement structure 26 is mounted on the receptacle 22. Each ramp 26*r* may extend upwardly from a respective shoulder 26*s* at a non-horizontal angle determined so as to provide a smooth transition of the lid 30 from a closed orientation to one of the open orientations described herein. A range of angles suitable for this purpose may be determined analytically and/or iteratively, through experimentation, for a particular design of storage receptacle assembly. Each ramp 26*r* may be structured to smoothly transition and blend into its respective shoulder 26*s* so that an associated lid projection 30*p* slides freely down the ramp 26*r* and off of the shoulder 26*s* as described herein.

Figure 2:
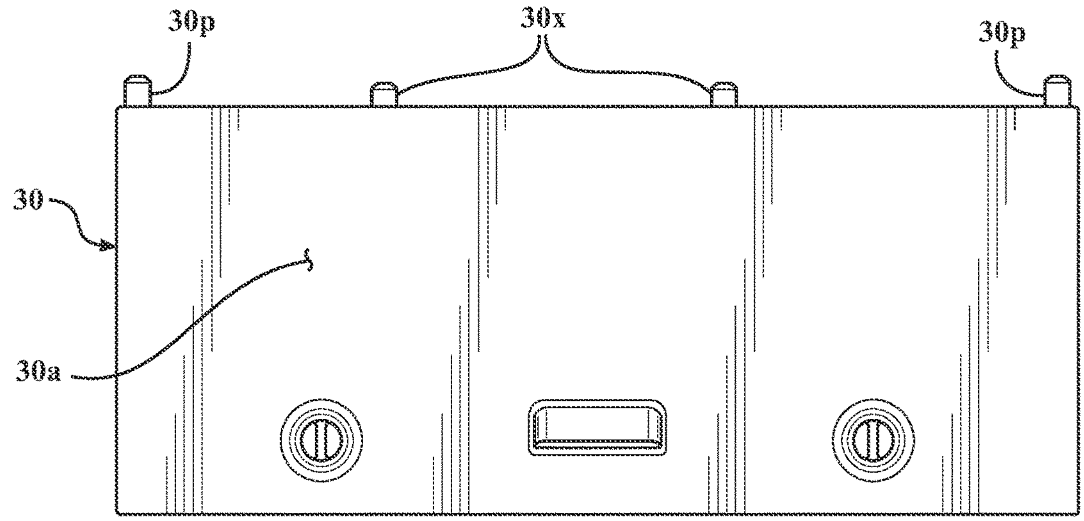
FIG. 2 is a schematic plan view of a storage receptacle lid in accordance with an embodiment described herein.

The storage receptacle assembly 20 may also include a lid 30. FIG. 2 is a schematic plan view of a storage receptacle lid 30 in accordance with an embodiment described herein. In one or more arrangements, the lid 30 may include a body portion 30*a* and at least one projection 30*p* extending from the body portion 30*a* and structured to extend into the slot 24*s* and to reside above the ramp 26*r* when the lid 30 is positioned in a closed orientation. The embodiment shown in FIG. 2 includes a pair of spaced-apart projections 30*p* structured to be received in respective ones of slots 24*s* (FIG. 3). As described herein, each projection 30*p* may be structured to contact an associated ramp 26*r*, slide down the ramp 26*r* to an associated shoulder 26*s*, and slide off the shoulder 26*s* into contact with an associated floor 26*f* during rotation of the lid 30 from the closed orientation to one of the open orientations described herein. An end or edge 30*e* of each projection 30*p* may be chamfered and/or radiused to facilitate sliding of the projection 30*p* upwardly along the shoulder 26*s* during manual closing of the lid 30. In the lid embodiment shown in FIG. 2, projections 30*p* are positioned proximate respective opposite ends of the lid 30. In other arrangements, the projections 30*p* may be located spaced apart from the ends of the lid 30. In some arrangements, the lid 30 may also include additional projections 30*x* which do not operate in the same manner as projections 30*p*, but which engage associated slots formed in lid support structure 24 to aid in stabilizing the lid 30 during rotation.

Operation of the lid 30 will now be discussed with reference to FIGS. 4-5E. Although lid operation will be described with respect to a single lid projection 30*p*, it will be understood that lid operation is the same with respect to all lid projections 30*p* and that rotation of the lid 30 will cause all associated projections 30*p* to simultaneously rotate and move along surfaces of associated projection engagement structures as described herein.

Figure 5B:
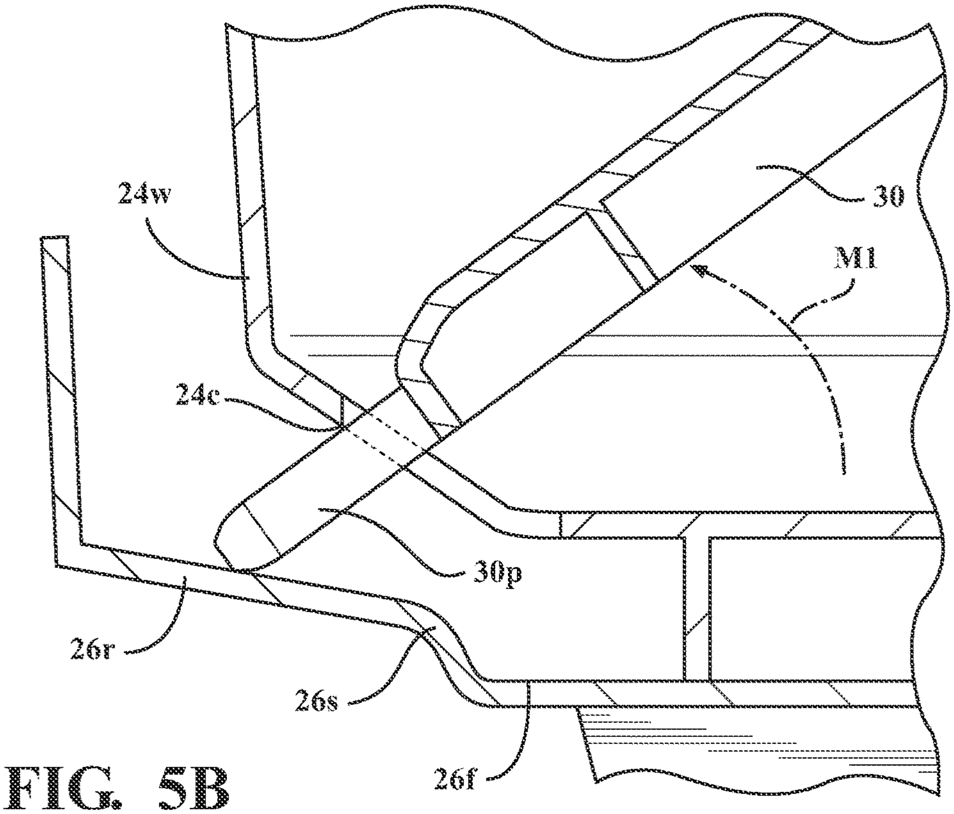
FIG. 5B is the view of FIG. 5A, showing an initial stage of rotation of the lid from the closed orientation toward an open orientation.

When it is desired to open the lid 30, a user may lift a front portion of the lid 30, causing rotation of the lid in direction M1 about a rear edge of the lid in physical contact with lid support surface 24*b* near slot first edge 24*f*. FIG. 5B is the view of FIG. 5A, showing an initial stage of rotation of the lid from the closed orientation toward an open orientation. Initially, as the lid 30 is rotated from the closed orientation, the projection 30*p* abuts the second edge 24*c* of the slot 24*s*, causing the lid to pivot about this slot edge. It is also noted that the lid 30 may (if desired) be completely removed from the storage receptacle assembly 20 when after the lid 30 has been rotated out of the closed condition.

Figure 5C:
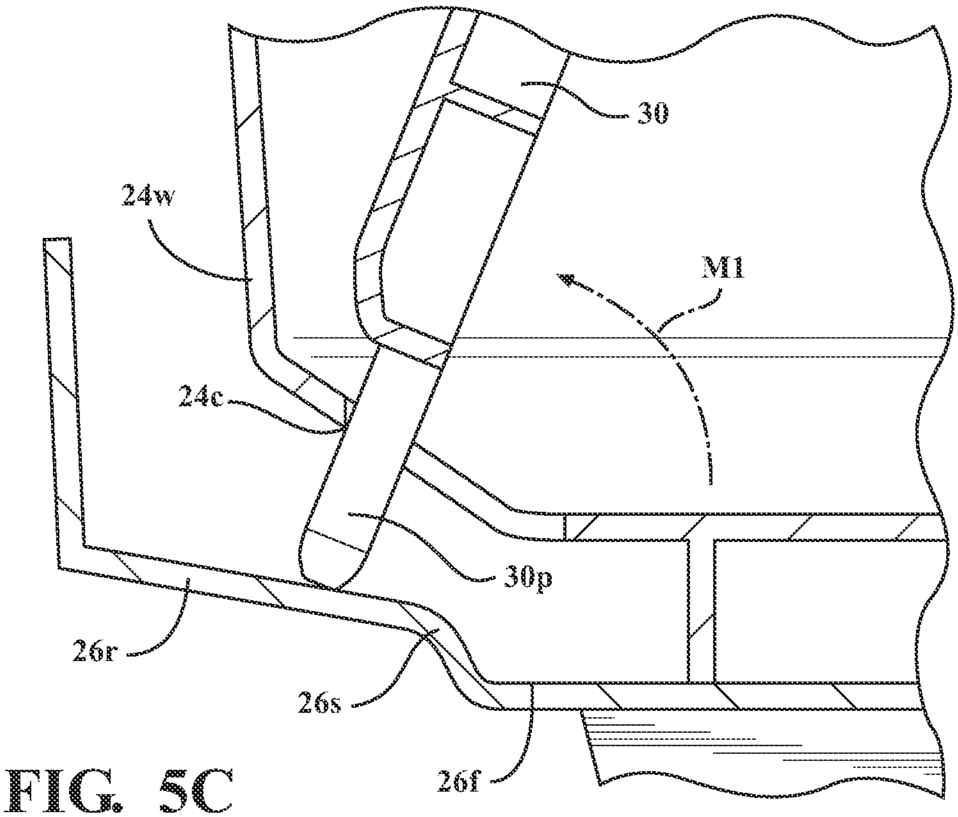
FIG. 5C is the view of FIG. 5B, showing a further stage of rotation of the lid toward an open orientation.
Figure 5D:
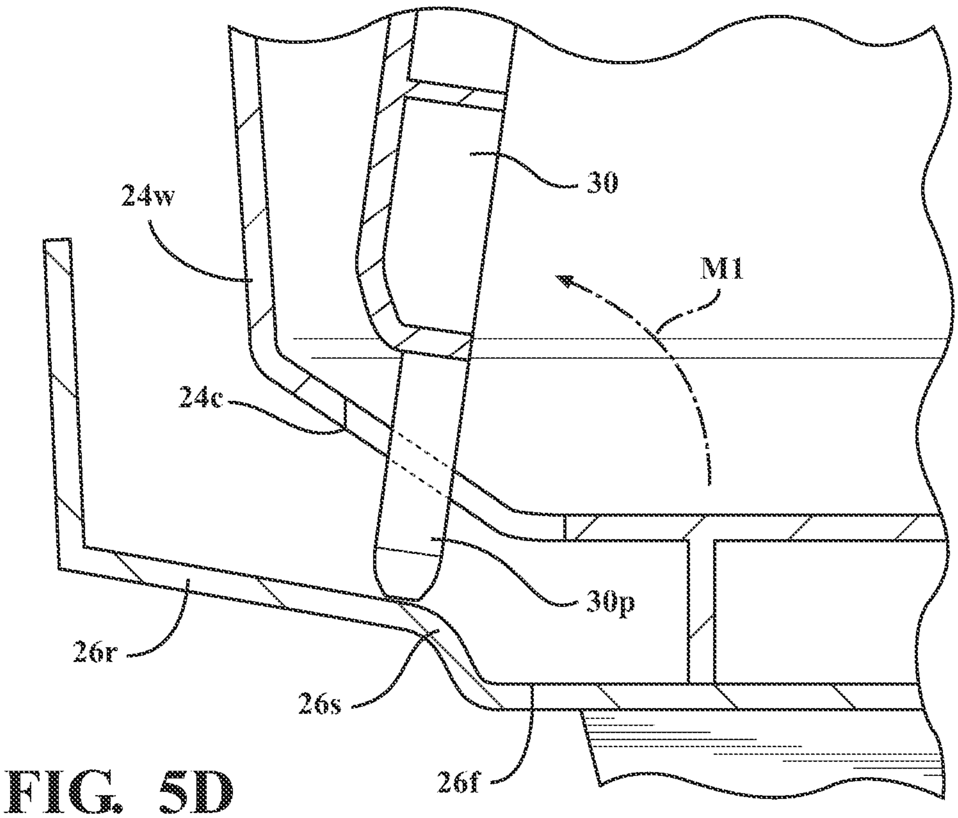
FIG. 5D is the view of FIG. 5C, showing a further stage of rotation of the lid toward an open orientation, with the lid sliding down a ramp of a projection engagement structure.

FIG. 5C is the view of FIG. 5B, showing a further stage of rotation of the lid toward an open orientation. The lid 30 may continue to pivot about the slot second edge 24*c* until it achieves a more vertical orientation. FIG. 5D is the view of FIG. 5C, showing a further stage of rotation of the lid toward an open orientation, with the weight of the lid causing the lid to start sliding down the ramp 26*r* of the projection engagement structure 26. The lid 30 may continue to slide down the ramp 26*r* and off the shoulder 26*s* blending with the ramp 26*r*.

Figure 5E:
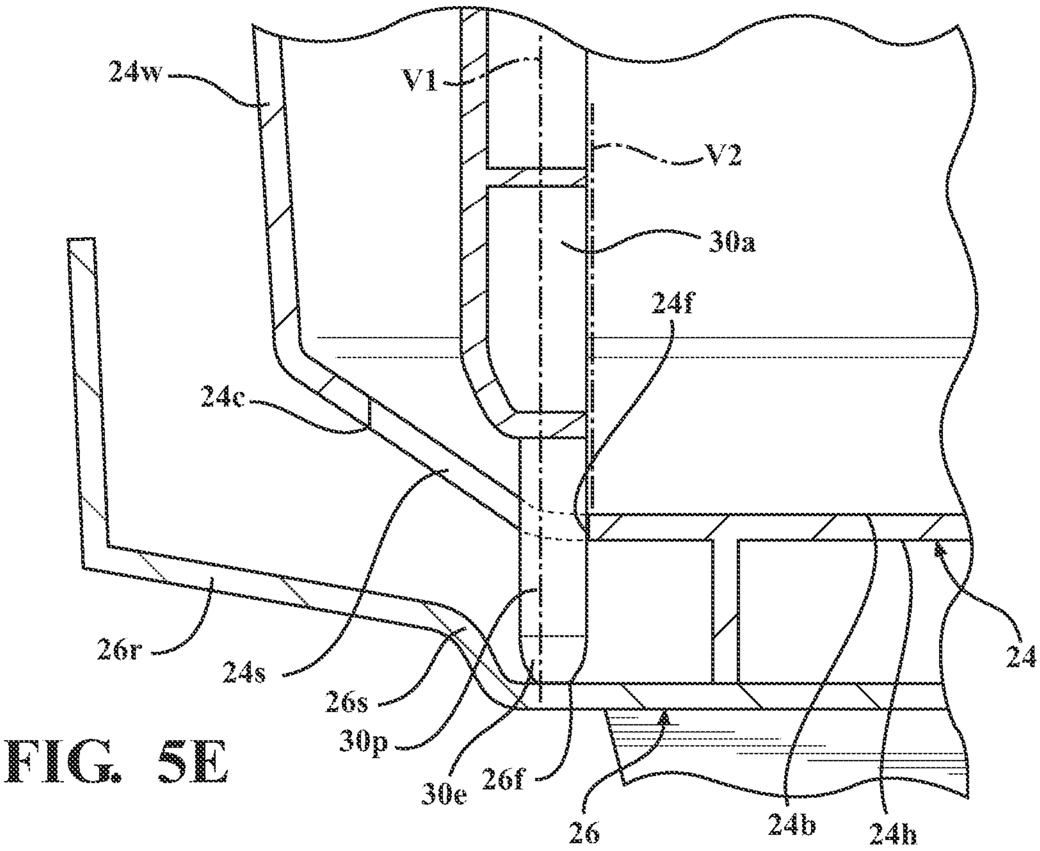
FIG. 5E is the view of FIG. 5D, showing a further stage of rotation of the lid toward an open orientation, with the lid having slid down the ramp and off of a shoulder of the projection engagement structure.

FIG. 5E is the view of FIG. 5D, showing a further stage of rotation of the lid 30 toward an open orientation, with the lid 30 having slid down the ramp 26*r* and off of the shoulder 26*s* and into contact with a floor 26*f* below the shoulder 26*s*. As seen in FIG. 4, the lid 30 may now be supported in a sub-vertical open orientation SV1 by the end 30*e* of the projection 30*p* abutting the shoulder 26*s* and another portion of the projection 30*p* leaning against the slot first edge 24*f*.

Referring again to FIG. 4, elements of the storage receptacle assembly 20 may be structured so that the lid 30 is maintainable in any of a trans-vertical open orientation TV1 and a sub-vertical open orientation SV1. A "trans-vertical orientation" of the lid 30 may be an orientation achieved by rotating the lid from the closed orientation to an orientation where a center of gravity (CG1) of the lid 30 is offset to a side S1 of a vertical plane V1 extending through the projection chamfered and/or radiused end 30*e* when the projection 30*p* is supported by the floor 26*f*. In this case, the lid has been rotated from the closed orientation (0°) to an orientation x in a range of 90°<x (where 90° is the vertical orientation). The trans-vertical open orientation TV1 of the lid 30 may be achieved when the lid is rotated to a trans-vertical orientation, with the lid leaning against another portion of the receptacle assembly 20 or another portion of the vehicle located along the side S1 of the vertical plane V1, while the projection 30*p* is supported by the floor 26*f*. When the lid 30 is tilted to a trans-vertical orientation, further rotation of the lid 30 in the direction W1 away from the closed orientation may be prevented by physical contact between the lid body 30*a* and the other portion of the storage receptacle assembly or vehicle, and/or by physical contact between the lid projection 30*p* and the first edge 24*f* of the slot 24*s*. Thus, the lid may then maintain itself in the trans-vertical open orientation TV1 by its own weight.

The trans-vertical open orientation TV1 may be achieved by either manually rotating the lid to the trans-vertical open orientation, or by rotating the lid 30 to a trans-vertical orientation other than the trans-vertical open orientation TV1, then releasing the lid 30. Since the lid has already been rotated to a trans-vertical orientation with the center of gravity CG1 offset to side S1 of the vertical plane V1, releasing the lid 30 will enable the lid to freely rotate to the trans-vertical open orientation. "Free rotation" of the lid 30 may be defined as rotation of the lid responsive to the weight of the lid alone. This may occur when the center of gravity CG1 of the lid 30 is offset to either side of the vertical plane V1, which extends from the end 30*e* of the projection 30*p* in contact with the floor 26*f*.

Referring again to FIG. 4, a "sub-vertical orientation" of the lid 30 may be an orientation achieved by rotating the lid from the closed orientation to an orientation where the center of gravity (CG) of the lid is offset to another side S2 of the vertical plane V1 opposite the first side S1. In this case, the lid has been rotated from the closed orientation (0° in this case) to an orientation x in a range of x<90°. The sub-vertical open orientation SV1 of the lid may be achieved when the lid is rotated to a sub-vertical orientation, with the projection 30*p* leaning against the first edge 24*f* of the slot 24*s* while the end 30*e* of the projection 30*p* rests against the shoulder 26*s* as shown in FIG. 4.

The sub-vertical open orientation SV1 may be achieved by either manually rotating the lid 30 to the sub-vertical open orientation, or by rotating the lid to a sub-vertical orientation other than the sub-vertical open orientation, then releasing the lid 30. Since the lid 30 has already been rotated to a sub-vertical orientation with the center of gravity CG1 offset to side S2 of the vertical plane V1, releasing the lid 30 will enable the lid to freely rotate to the sub-vertical open orientation SV1.

Elements of the storage receptacle assembly 20 may be structured so that the weight of the lid 30 will be insufficient to cause the projection end 30*e* to slide back up along the shoulder 26*s* so that the lid 30 rotates back to the closed orientation, when the lid is in the sub-vertical open orientation SV1 (i.e., the projection 30*p* and the shoulder 26*s* may be structured so that free rotation of the lid 30 in a direction toward the closed orientation is impeded by contact between the projection 30*p* and the shoulder 26*s* and by contact between the projection 30*p* and the slot first edge 24*f* when the lid is in the sub-vertical open orientation SV1).

To facilitate manual closing of the lid 30 from the sub-vertical open orientation SV1, the projection 30*p* and the shoulder 26*s* may be structured so that the end 30*e* of the projection 30*p* is upwardly movable along the shoulder 26*s* responsive to manual application of a force above a predetermined threshold force to the lid 30, in a direction toward the closed orientation. The manually applied force is thus added to the gravitational force acting at the lid center of gravity CG1 when the lid 30 is in the sub-vertical open orientation SV1. The desired predetermined threshold for the manual closing force may be determined based on product requirements and may be adjusted analytically and/or experimentally by appropriate modification of values of such parameters as the location of the lid center of gravity CG, static and kinetic friction coefficients of the surfaces of shoulder 26*s* and projection 30*p*, and other pertinent parameters.

Figure 6:
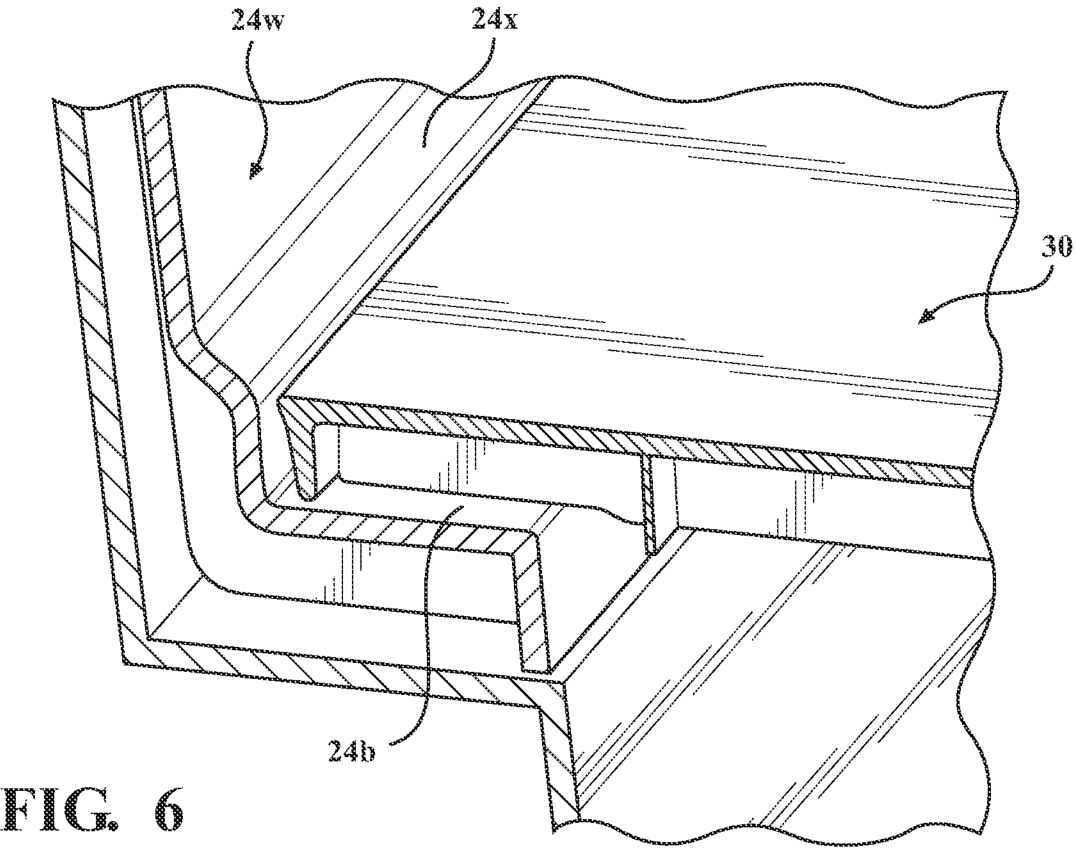
FIG. 6 is a schematic perspective view of a portion of a storage receptacle resting on a base of a lid support structure, and illustrating a sloped surface of a wall of the lid support structure configured to guide the lid into contact with the base when the lid is rotated to the closed orientation.

FIG. 6 is a schematic perspective view of a portion of a storage receptacle assembly lid 30 resting on a base 24*h* of a lid support structure 24, and illustrating a sloped surface 24*x* of a wall 24*w* of the lid support structure 24 configured to guide the lid into contact with the base 24*h* when the lid 30 is rotated to the closed orientation. The sloped surface 24*x* of the wall 24*w* may extend along an entire interior surface of the wall 24*w* or only along specific parts of the interior surface of the wall 24*w*. Any portion of the lid 30 contacting the sloped surface 24*x* will tend to slide down the sloped surface and be directed toward the lid support surfaces 24*b*.

Figure 7:
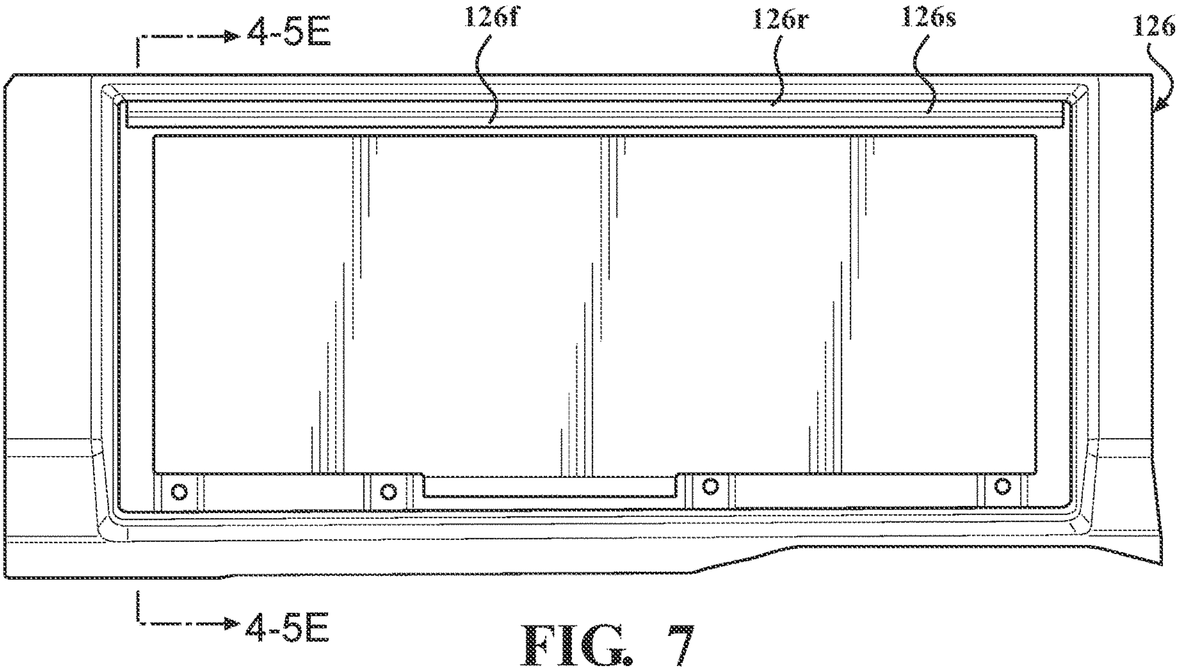
FIG. 7 is a schematic plan view of a projection engagement structure in accordance with an alternative embodiment described herein.
Figure 8:
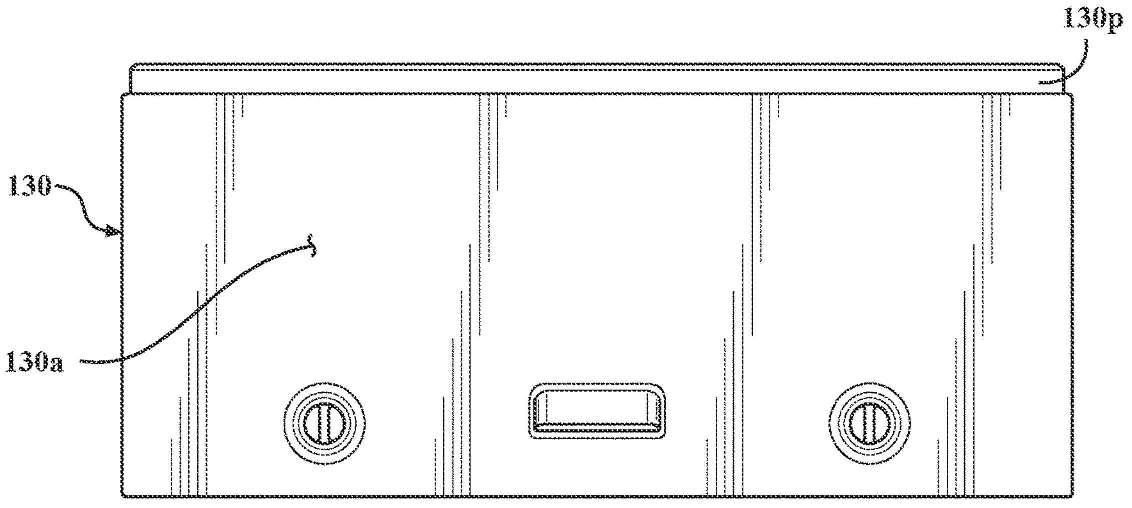
FIG. 8 is a schematic plan view of a lid in accordance with an alternative embodiment described herein.
Figure 9:
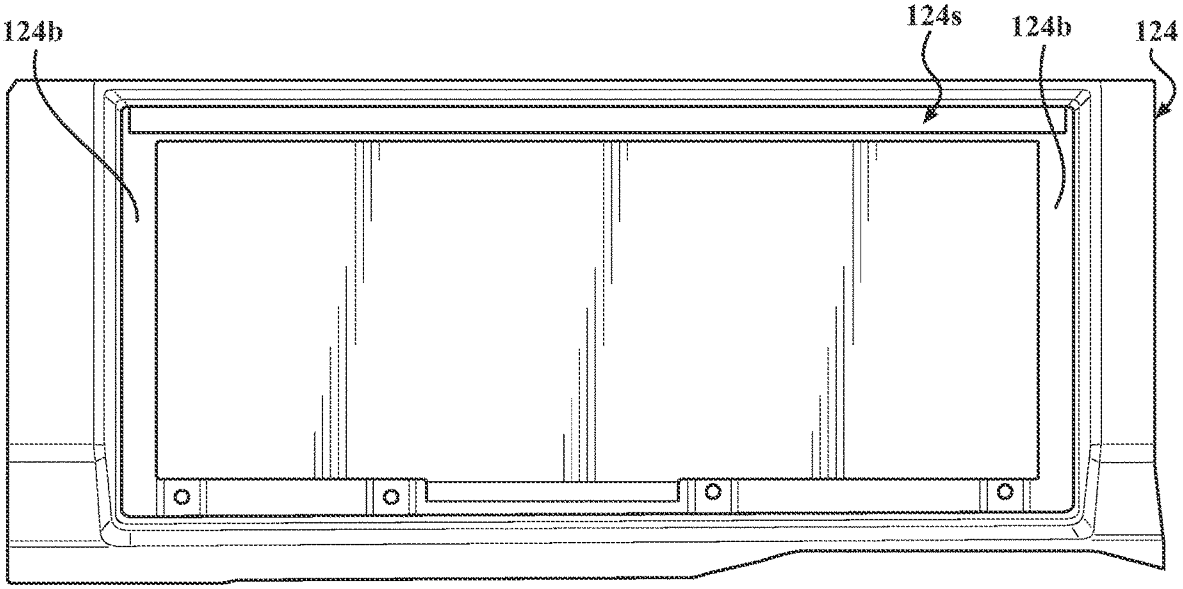
FIG. 9 is a schematic plan view of a lid support structure in accordance with an alternative embodiment described herein.

Referring now to FIGS. 7-9, in one or more arrangements, a storage receptacle assembly may have the elements previously described, including a lid support structure 124 (FIG. 9) having a base with one or more support surfaces 124*b*, a wall 124*w* extending from the base, and a slot 124*s* having a first edge formed in the base and a second edge formed in the wall. A projection engagement structure 126 (FIG. 7) may be positioned below the slot 124*s* and may include a floor, a shoulder 126*s* extending upwardly from the floor, and a ramp 126*r* extending upwardly from the shoulder. A lid 130 (FIG. 8) includes a body portion 130*a* and a projection 130*p* extending from the body portion 130*a* and structured to extend into the slot 124*s* and to reside above the ramp 126*r* when the lid is positioned in a closed orientation. The projection may be structured to contact the ramp 126*r*, slide down the ramp 126*r* to the shoulder 126*s*, and slide off the shoulder 126*s* into contact with the floor 126*f* during rotation of the lid 130 from the closed orientation to an open orientation.

The storage receptacle assembly elements shown in FIGS. 7-9 may be structured as previously described and rotation of the lid 130 to one of the open orientations (and securement of the lid in one of the open orientations) may be performed in the manner previously described. However, in the arrangement shown in FIGS. 7-9, operation of the lid 130 is performed using a single elongated lid projection 130*p* interacting as described with a single elongated projection engagement structure 126.

The elements of the storage receptacle assembly embodiments described herein may be fabricated from any material or materials suitable for the purposes described herein.

The storage receptacle assembly structures described herein enable the lid to remain mounted on the receptacle when the lid is open, or to be removed from the receptacle if desired. The storage receptacle assembly structures described herein also enable the lid to be rotated between a closed orientation and any of multiple open orientations without the use of any hinges. The lid may also be supported in any of the multiple open orientations without the use of lid props or similar devices. Thus, use of the storage receptacle assembly obviates the need for hinges, lid props and other structures which may add to the complexity, manufacturing cost, and product cost of a lid assembly.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A storage receptacle assembly for a vehicle, the assembly comprising:

a lid support structure including a base, a wall extending from the base, and a slot having a first edge formed in the base and a second edge formed in the wall;

a projection engagement structure positioned below the slot and including:

a floor;

a shoulder extending upwardly from the floor; and a ramp extending upwardly from the shoulder; and a lid including a projection structured to extend into the slot and to reside above the ramp when the lid is positioned in a closed orientation, the projection being structured to contact the ramp, slide down the ramp to the shoulder, and slide off the shoulder into contact with the floor during rotation of the lid from the closed orientation to an open orientation.

2. The assembly of claim 1, wherein the projection is supported by the floor between the shoulder and a vertical plane extending through the slot first edge when the lid is in an open orientation.

3. The assembly of claim 1, wherein the projection and the shoulder are structured so that free rotation of the lid in a direction toward the closed orientation is impeded by contact between the projection and the shoulder and by contact between the projection and the slot first edge when the lid is in an open orientation.

4. The assembly of claim 3, wherein the projection the shoulder are structured so that the projection is upwardly movable along the shoulder responsive to manual application of a force above a predetermined threshold force to the lid, in a direction toward the closed orientation.

5. The assembly of claim 4, wherein an end of the projection is chamfered and/or radiused.

6. The assembly of claim 1, wherein the wall is structured to enable the lid to rotate to a trans-vertical open orientation.

7. The assembly of claim 1, wherein the lid and the projection engagement structure are structured to enable the lid to rotate to, and be maintained, a sub-vertical open orientation by contact of the projection with the slot first edge and the shoulder.

8. The assembly of claim 1, wherein the lid support structure includes another slot having a first edge formed in the base and a second edge formed in the wall, and wherein the assembly further comprises another projection engagement structure positioned below the other slot and including:

another floor;

another shoulder extending upwardly from the other floor; and another ramp extending upwardly from the other shoulder, wherein the lid includes another projection structured to extend into the other slot and to reside above the other ramp when the lid is positioned in a closed orientation, the other projection being structured to contact the other ramp, slide down the other ramp to the other shoulder, and slide off the other shoulder into contact with the other floor during rotation of the lid from the closed orientation to an open orientation.

9. The assembly of claim 1, further comprising:

another lid support structure including a another base, another wall extending from the other base, and another slot having a first edge formed in the other base and a second edge formed in the other wall; and another projection engagement structure positioned below the other slot and including:

another floor;

another shoulder extending upwardly from the other floor; and another ramp extending upwardly from the other shoulder, wherein the lid includes another projection structured to extend into the other slot and to reside above the other ramp when the lid is positioned in a closed orientation, the other projection being structured to contact the other ramp, slide down the other ramp to the other shoulder, and slide off the other shoulder into contact with the other floor during rotation of the lid from the closed orientation to an open orientation.

* * * * *